(12) United States Patent
Yamauchi et al.

(10) Patent No.: US 9,219,636 B2
(45) Date of Patent: Dec. 22, 2015

(54) DATA SHARING SYSTEM, TERMINAL, AND DATA SHARING METHOD

(71) Applicant: FUJITSU LIMITED, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: FUJITSU LIMITED, Kanagawa (JP)

( * ) Notice: Subject to any disclaimer, the term of this patent is extended or adjusted under 35 U.S.C. 154(b) by 338 days.

(21) Appl. No.: 13/801,783

(22) Filed: Mar. 13, 2013

(65) Prior Publication Data

US 2013/0198270 A1    Aug. 1, 2013

Related U.S. Application Data

(63) Continuation of application No. PCT/JP2010/066091, filed on Sep. 16, 2010.

(51) Int. Cl.
*G06F 15/16* (2006.01)
*H04L 29/08* (2006.01)
*G06F 13/00* (2006.01)

(52) U.S. Cl.
CPC .......... *H04L 29/08522* (2013.01); *G06F 13/00* (2013.01); *H04L 67/1091* (2013.01); *Y02B 60/1228* (2013.01)

(58) Field of Classification Search
CPC .............. G06F 13/00; H04L 29/08522; H04L 67/1091
USPC ......................................................... 709/203
See application file for complete search history.

(56) References Cited

U.S. PATENT DOCUMENTS

| 2003/0225904 A1 | 12/2003 | Kanno et al. |
| 2005/0289237 A1 | 12/2005 | Matsubara et al. |
| 2006/0015875 A1 | 1/2006 | Ishihara et al. |
| 2009/0238182 A1 | 9/2009 | Yanagihara |
| 2010/0103933 A1 | 4/2010 | Akahane |

FOREIGN PATENT DOCUMENTS

CN    101631092 A    1/2010
(Continued)

OTHER PUBLICATIONS

Chinese Office Action issued Dec. 3, 2014; Chinese Application No. 201080069069.X, with English Translation.

*Primary Examiner* — David X Yi
(74) *Attorney, Agent, or Firm* — Arent Fox LLP

(57) ABSTRACT

A data sharing system includes communicable terminals and selects a server-client system in which a first terminal is designated as a server and other terminals are designated as clients, when a sum of estimated time for transferring data to the first terminal from the other terminals, estimated time for performing, by the first terminal, arithmetic processing of the data in the first terminal, and estimated time for transferring arithmetically processed data from the first terminal to the other terminals satisfies a real time restriction, and power estimated to be consumed at a time of performing, by the first terminal, the arithmetic processing of the data in the first terminal is less than power estimated to be consumed at a time of performing the arithmetic processing by the other terminals. The data sharing system selects a peer-to-peer system, when the sum does not satisfy the real time restriction in any terminal.

14 Claims, 12 Drawing Sheets

(56) References Cited

FOREIGN PATENT DOCUMENTS

| | | |
|---|---|---|
| JP | 2003-208414 A | 7/2003 |
| JP | 2003-281008 A | 10/2003 |
| JP | 2006-011693 A | 1/2006 |
| JP | 2006-293743 A | 10/2006 |
| JP | 2009-232271 A | 10/2009 |
| JP | 2010-109426 A | 5/2010 |
| WO | WO 2004/086246 A1 | 10/2004 |

FIG.4

```
APPLICATION DATA TABLE
- APPLICATION PROGRAM #0:
-- DATA SHARING METHOD: DETERMINED AT
TIME OF EXECUTION
-- POWER CONSUMPTION CALCULATION
FORMULA
-- PROCESSING TIME THRESHOLD
-- REMAINING BATTERY LEVEL THRESHOLD
-- CPU LOAD FACTOR
-- INTER-TERMINAL DISTANCE
-- RESPECTIVE TERMINAL REMAINING BATTERY
LEVEL
- APPLICATION PROGRAM #1:
-- DATA SHARING METHOD: CS SYSTEM
     (APPLICATION DESIRED TO REDUCE POWER
CONSUMPTION)
-- CPU LOAD FACTOR
-- RESPECTIVE TERMINAL REMAINING BATTERY
LEVEL
...
- APPLICATION PROGRAM #n:
-- DATA SHARING METHOD: P2P SYSTEM
     (APPLICATION THAT REQUIRES HIGH-SPEED
PROCESSING)
-- APPLICATION PROGRAM #o: ...
              ⋮
```

~21

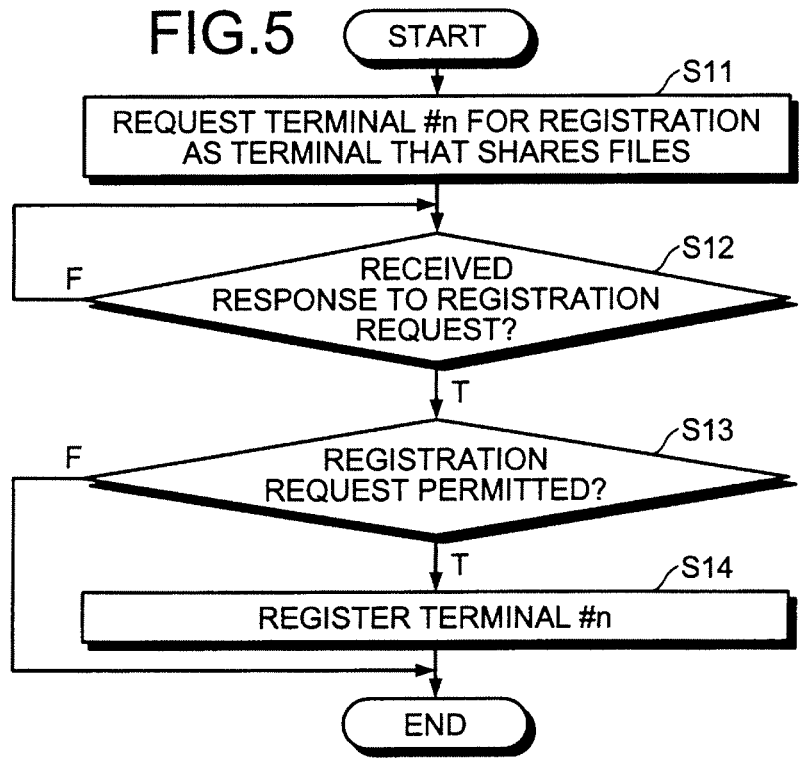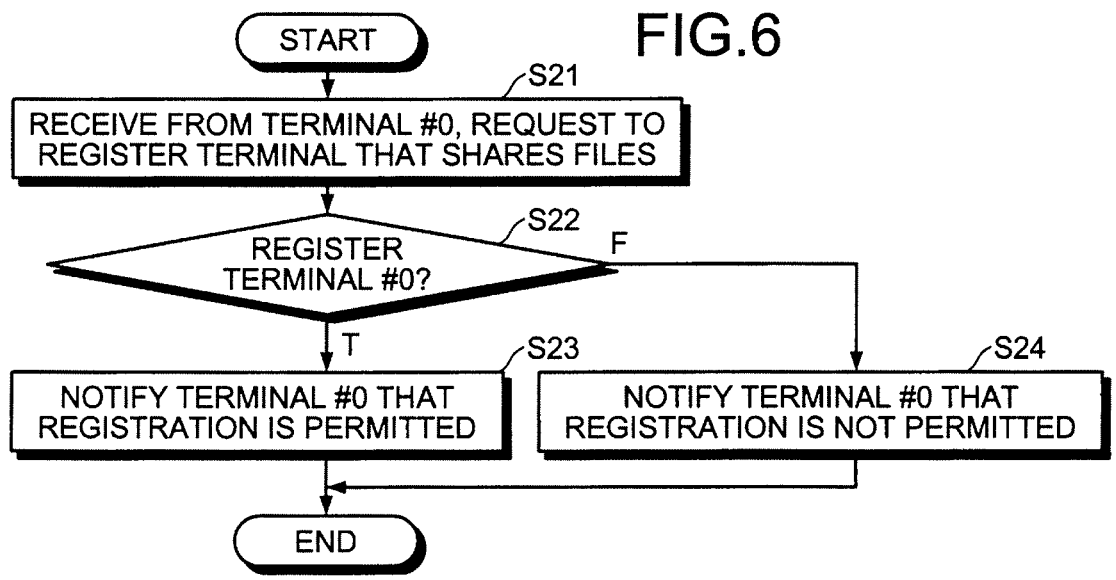

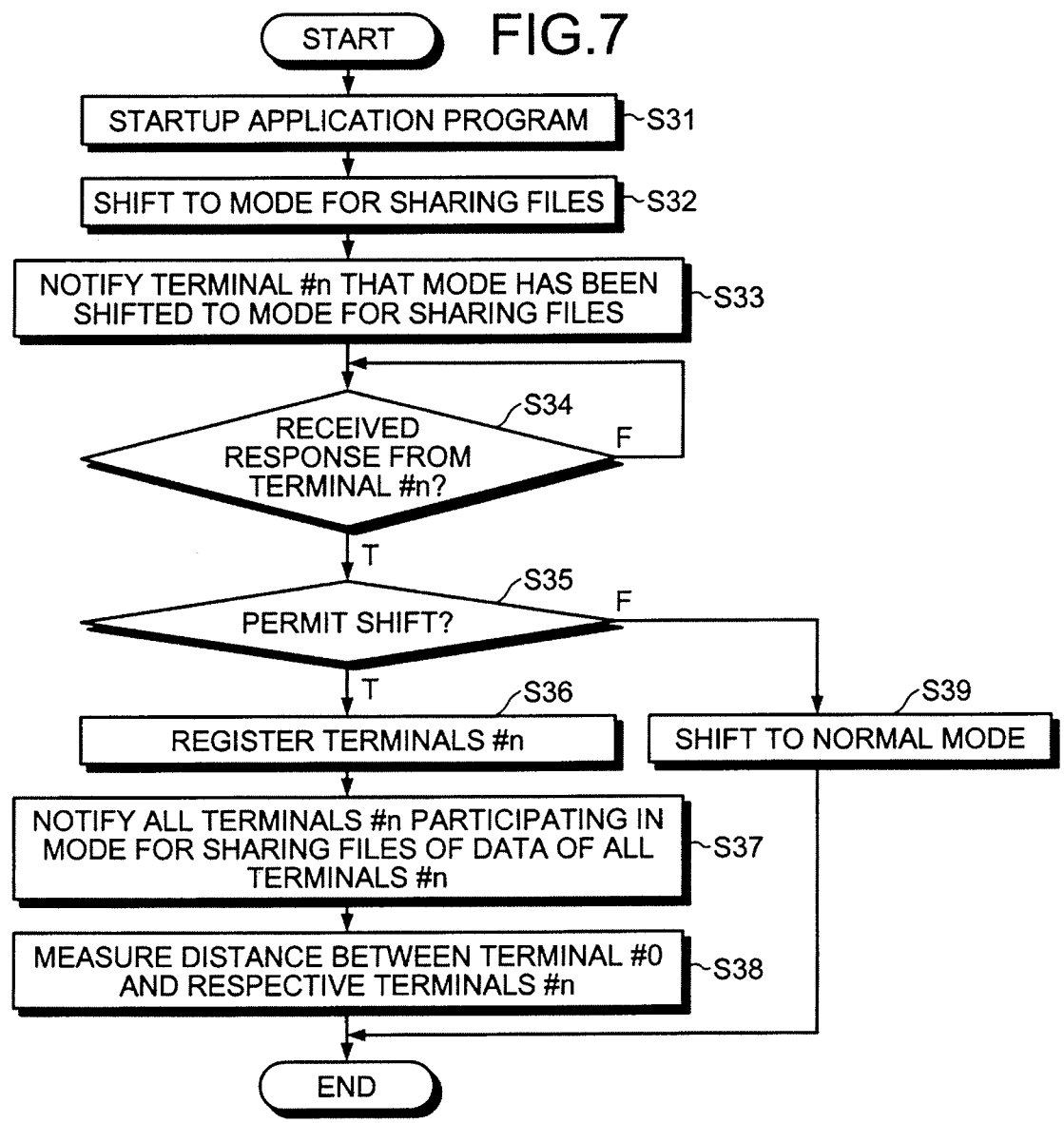

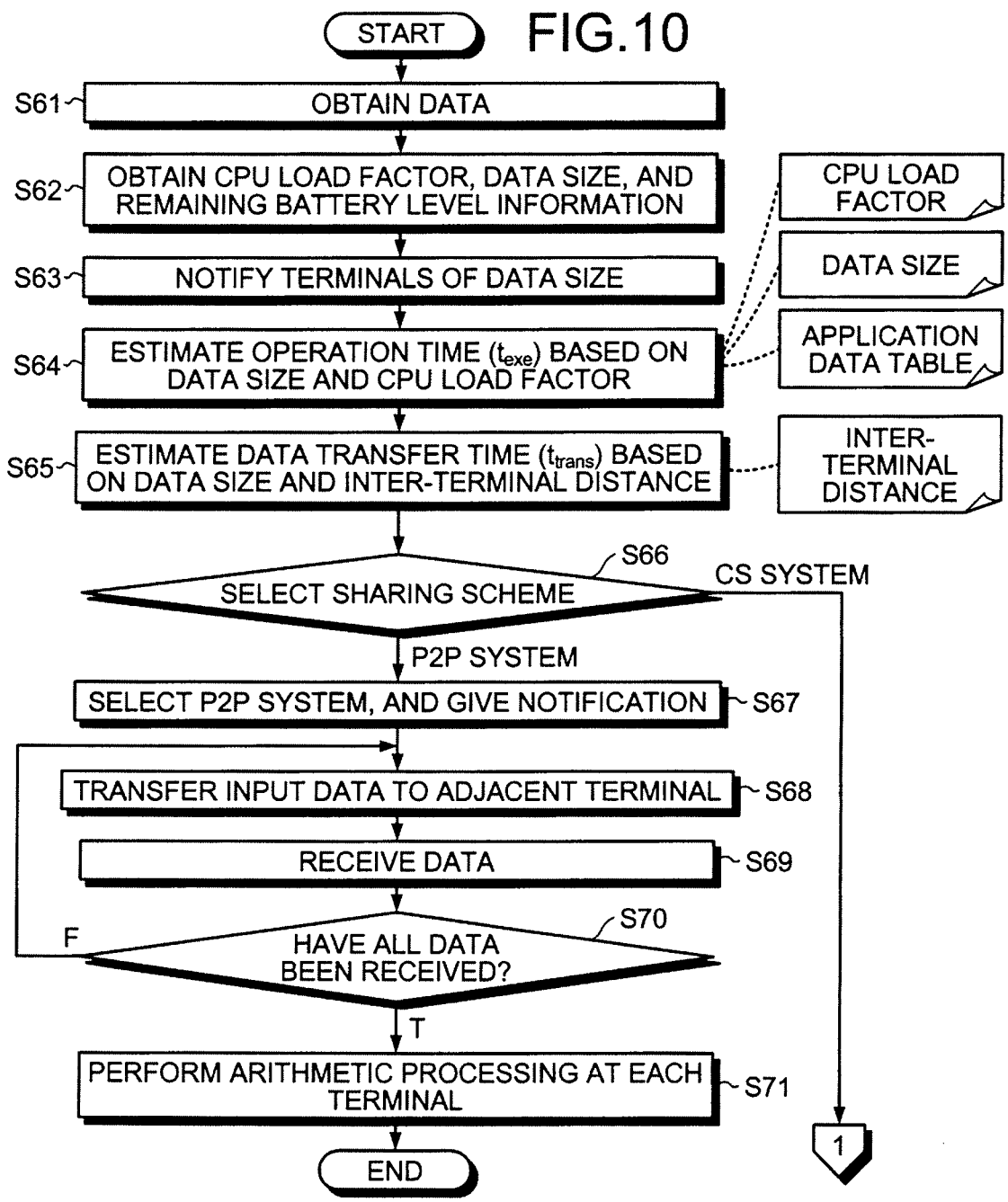

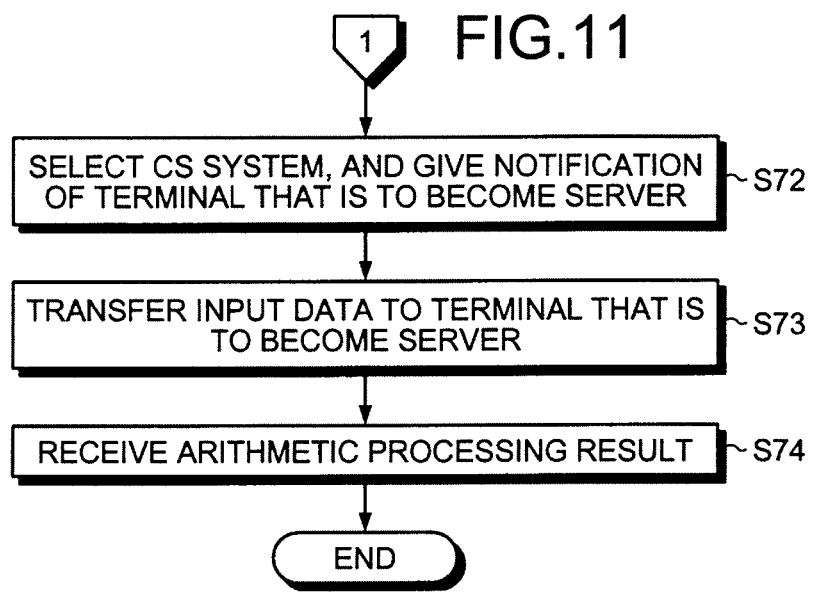

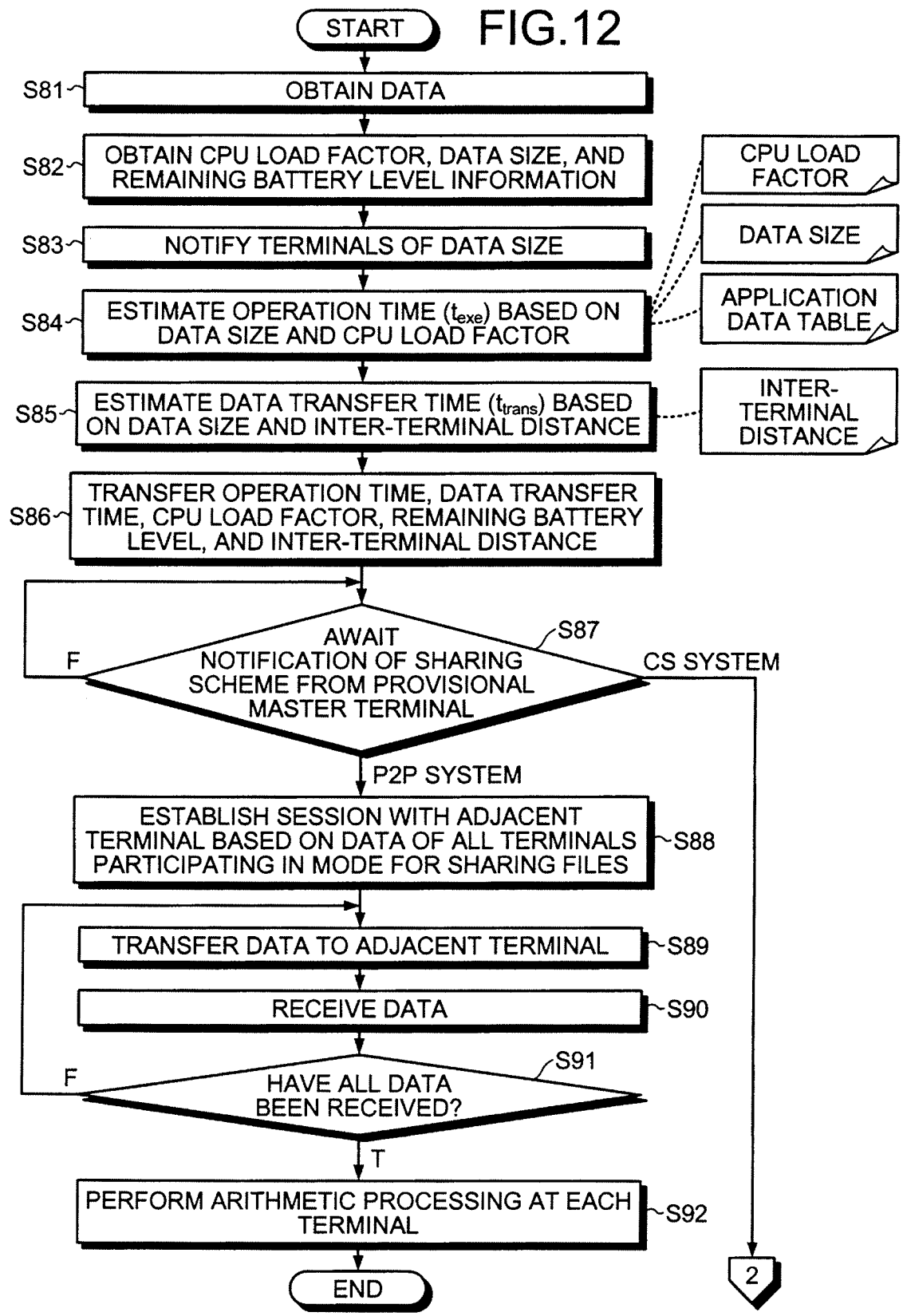

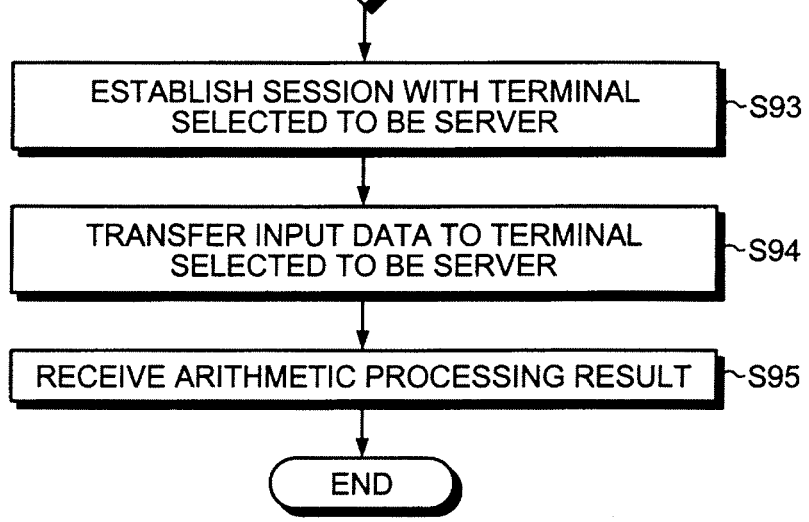
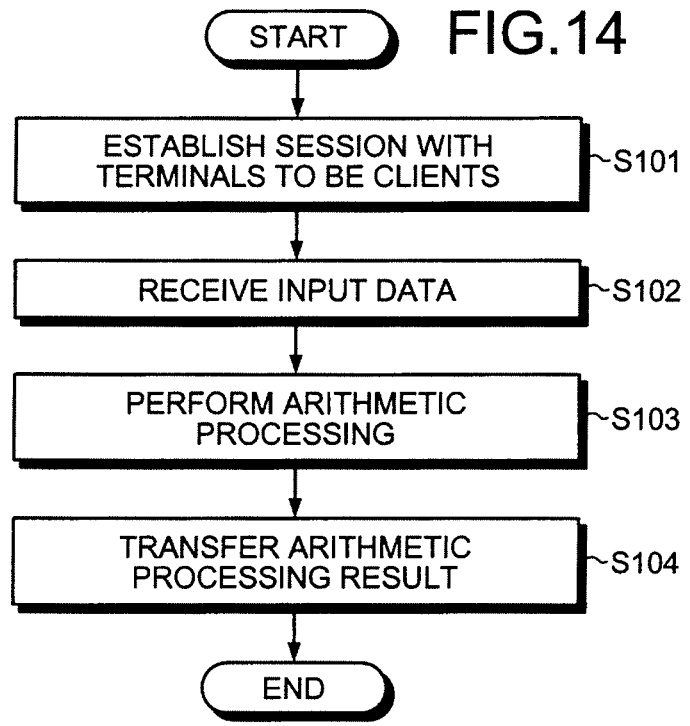

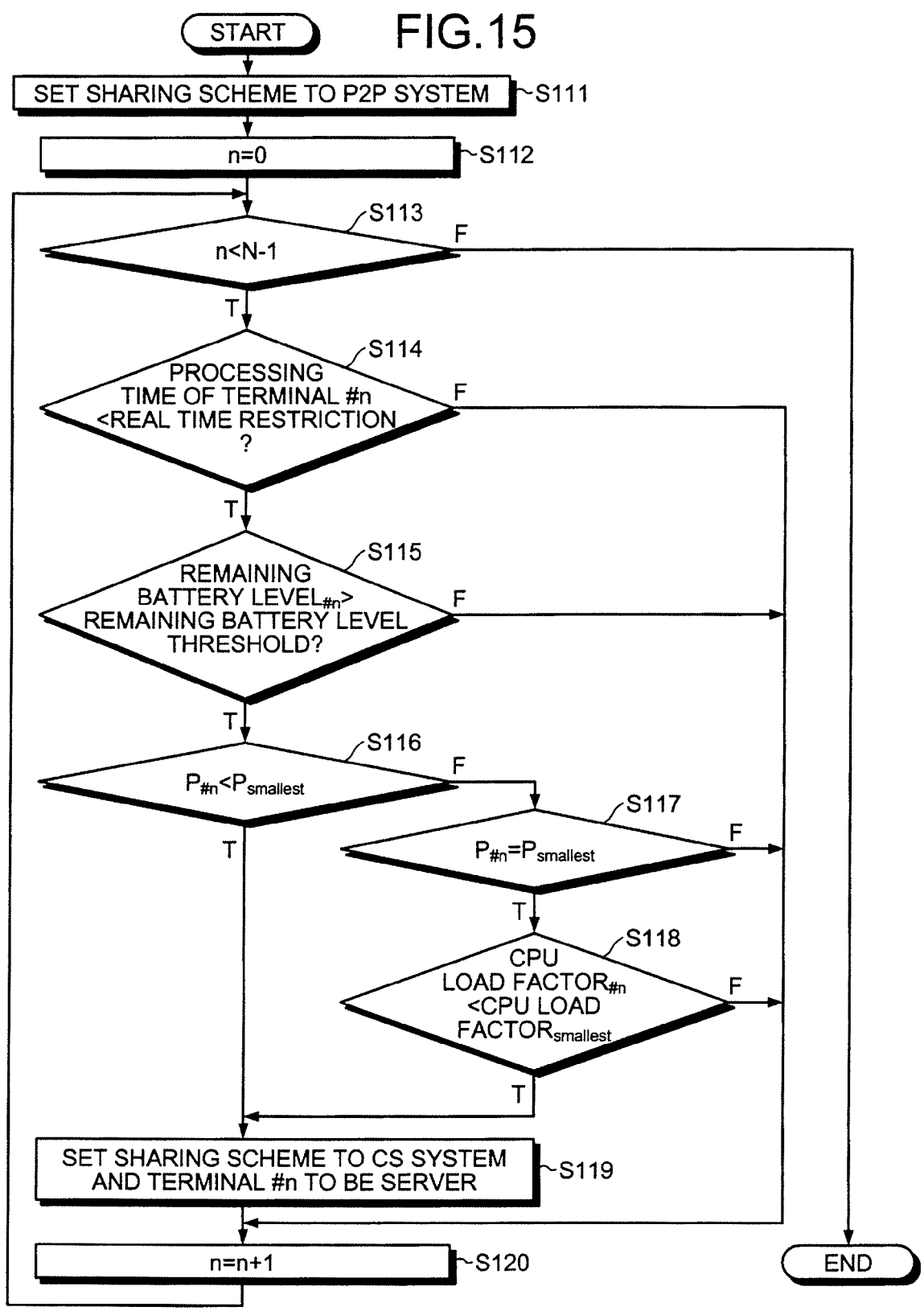

DATA SHARING SYSTEM, TERMINAL, AND DATA SHARING METHOD

CROSS REFERENCE TO RELATED APPLICATIONS

This application is a continuation application of International Application PCT/JP2010/066091, filed on Sep. 16, 2010 and designating the U.S., the entire contents of which are incorporated herein by reference.

FIELD

The embodiment discussed herein relates to a data sharing system, a terminal, and a data sharing method.

BACKGROUND

Conventionally, examples of a scheme for sharing data between multiple terminals include a server-client scheme and a peer-to-peer (Peer to Peer) scheme. In a server-client scheme, a server terminal collects all data from client terminals and performs arithmetic processing. The server terminal transfers arithmetic processing results to the client terminals. In a peer-to-peer scheme, terminals on a network exchange data, and each terminal performs arithmetic processing. "Peer to Peer" may be abbreviated as "P2P". In the description herein, the server client is abbreviated as "CS", and "Peer to Peer" is abbreviated as "P2P".

Under both the P2P scheme and the CS scheme is a system having advantages of both schemes and in which a management server receives a registration request and an access request for data shared between client devices, and each client device stores therein data and accesses the data upon receiving an approval response from the management server. For an example, refer to Japanese Laid-Open Patent Publication No. 2006-11693

Nonetheless, in a conventional CS system, although power consumption of the entire system can be reduced since one terminal performs arithmetic processing, from the collection of data until the completion of transfer of the arithmetic processing result takes time because data communication is performed between the server terminal and the respective client terminals at the time of data collection and transfer of the arithmetic processing result. On the other hand, in a conventional P2P system, data communication is only performed at the time of inputting data to a terminal from another terminal. Therefore, only a short period of time is consumed from the input of data until the completion of the arithmetic processing. However, because each terminal performs arithmetic processing, power consumption of the entire system increases. It is therefore desirable to share the data in a CS system when power consumption of the entire system including the arithmetic processing by each terminal is desired to be reduced, and to share the data in a P2P system when high-speed processing is desired.

SUMMARY

According to an aspect of an embodiment, a data sharing system includes multiple terminals that can communicate with each other. The data sharing system selects a server-client system in which among the terminals, a first terminal is designated as a server and other terminals are designated as clients, when a sum of time estimated to be required for transferring data to the first terminal from the other terminals, time estimated to be required for performing, by the first terminal, arithmetic processing of data aggregated in the first terminal, and time estimated to be required for transferring arithmetically processed data from the first terminal to the other terminals satisfies a real time restriction, and power estimated to be consumed at a time of performing, by the first terminal, the arithmetic processing of the data aggregated in the first terminal is less than power estimated to be consumed at a time of performing the arithmetic processing by the other terminals; and the data sharing system selects a peer-to-peer system, when the sum does not satisfy the real time restriction in any terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts an application data table according to the second embodiment;

FIG. 5 is a flowchart of a procedure for registering a terminal permitting file sharing, in the data sharing method according to the second embodiment;

FIG. 6 is a flowchart of a procedure for registering a terminal permitting file sharing, in the data sharing method according to the second embodiment;

FIG. 7 is a flowchart of a procedure for setting a provisional master terminal and measuring inter-terminal distance, in the data sharing method according to the second embodiment;

FIG. 10 is a flowchart of an overall process in a data sharing scheme selected in the file sharing method according to the second embodiment;

FIG. 11 is a flowchart of steps subsequent to those depicted in FIG. 10;

FIG. 12 is a flowchart of an overall process in a data sharing scheme selected in the file sharing method according to the second embodiment;

FIG. 13 is a flowchart of steps subsequent to those depicted in FIG. 12;

FIG. 14 is a flowchart of an overall process in a data sharing scheme selected in the file sharing method according to the second embodiment; and FIG. 15 is a flowchart of a selection procedure for selecting the sharing scheme, in the file sharing method according to the second embodiment.

DESCRIPTION OF EMBODIMENTS

Embodiments of a data sharing system, a terminal, and a data sharing method according to the present invention will be explained below in detail with reference to the accompanying drawings. In the data sharing system, the total time for transferring to other terminals, a result obtained by aggregating data in one terminal and performing arithmetic processing of the data and power consumption at the time of performing the arithmetic processing are estimated to select a P2P scheme or a CS scheme. In the present specification and the accompanying drawings, "application program" may be simply referred to as "application". The present invention is not limited to the embodiments.

Figure 1:
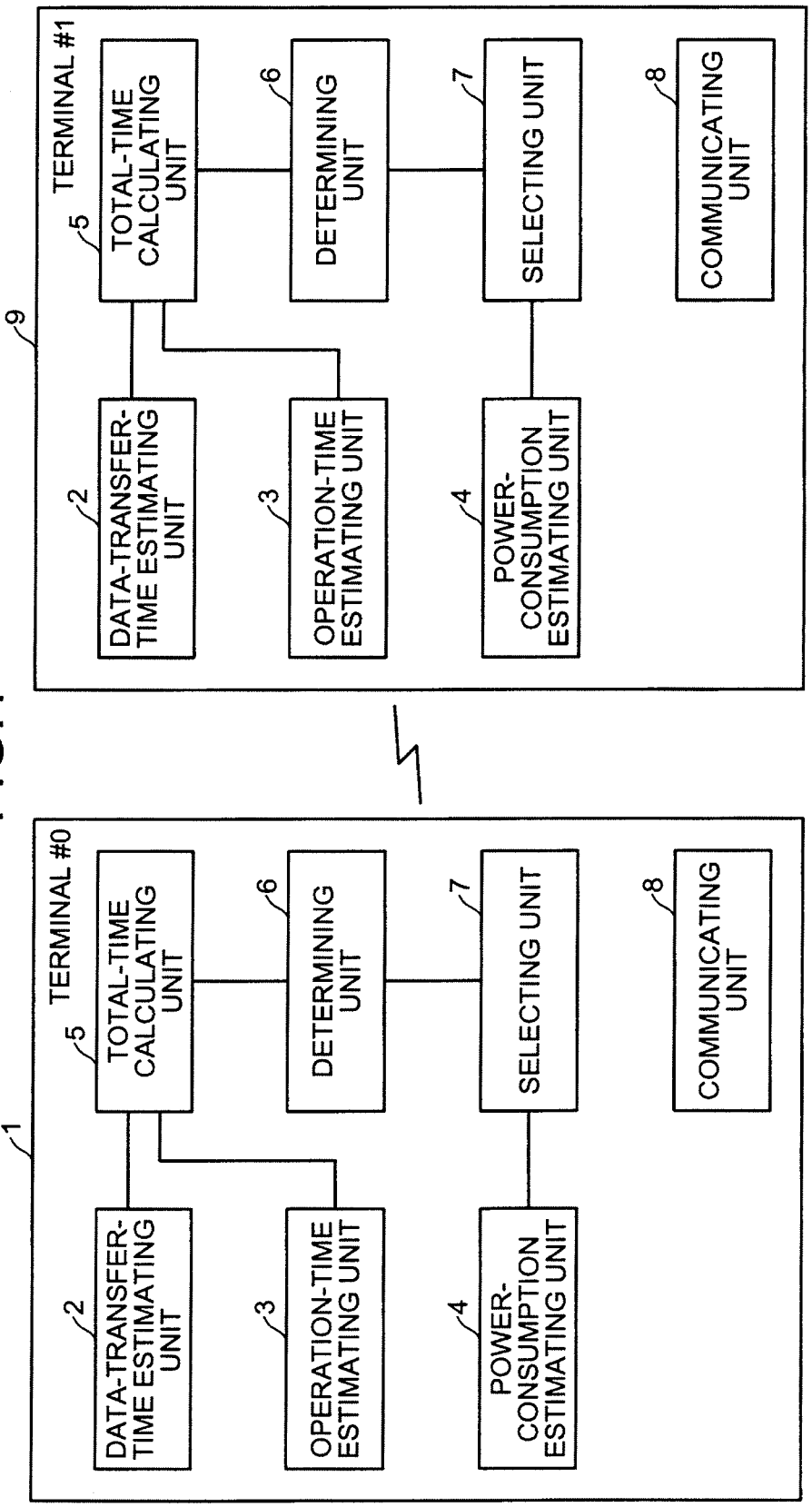
FIG. 1 is a block diagram of a data sharing system according to a first embodiment.

FIG. 1 is a block diagram of a data sharing system according to a first embodiment of the present invention. As depicted in FIG. 1, the data sharing system includes multiple terminals (#0 and #1) 1 and 9 that can communicate with each other. The number of the terminals can be three or more. The respective terminals 1 and 9 include a data-transfer-time estimating unit 2, an operation-time estimating unit 3, a power-consumption estimating unit 4, a total-time calculating unit 5, a determining unit 6, a selecting unit 7, and a communicating unit 8. These units can be implemented by executing on a processor, a program for implementing the data sharing method described later. The program is stored in, for example, a memory (not depicted), and is called by, for example, a processor (not depicted) and is sequentially executed.

The data-transfer-time estimating unit 2 estimates the time required to receive data transferred from a communicable terminal and the time required to transfer arithmetically processed data to other terminals. The operation-time estimating unit 3 estimates the time required for the terminal of the operation-time estimating unit 3 to perform arithmetic processing of the data aggregated in the terminal of the operation-time estimating unit 3. The total-time calculating unit 5 calculates the total of the data transfer time estimated by the data-transfer-time estimating unit 2 and the operation time estimated by the operation-time estimating unit 3. The determining unit 6 determines whether the total time calculated by the total-time calculating unit 5 satisfies a real time restriction. The power-consumption estimating unit 4 estimates the power to be consumed at the time of performing the arithmetic processing of the data aggregated in the terminal of the operation-time estimating unit 3.

The selecting unit 7 selects the CS system if the determining unit 6 determines that the total time satisfies the real time restriction, and the power consumption estimated by the power-consumption estimating unit 4 is less than power consumption estimated to be consumed at the time of performing the same arithmetic processing by other terminals. In the CS system, the terminal aggregating data therein and performing the arithmetic processing is designated as a server and other terminals are designated as clients. The selecting unit 7 selects the P2P system when the total time does not satisfy the real time restriction in any of the terminals.

Figure 2:
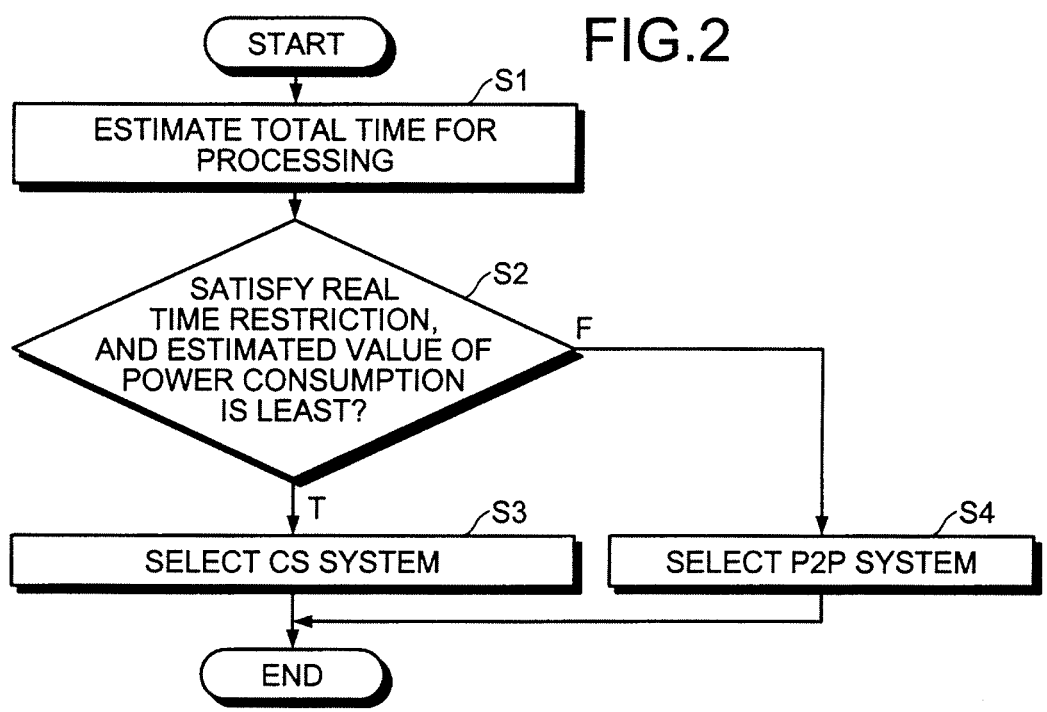
FIG. 2 is a flowchart depicting a data sharing method according to the first embodiment.

FIG. 2 is a flowchart depicting the data sharing method according to the first embodiment. A case where a first terminal #0_1 becomes a server in the CS system is explained. As depicted in FIG. 2, when processing for implementing the data sharing method is started, the data-transfer-time estimating unit 2 in the first terminal #0_1 estimates a time $t_{trans(in)}$ required for transferring data from another terminal #1_9 to the first terminal #0_1 via the communicating unit 8. The data-transfer-time estimating unit 2 in the first terminal #0_1 also estimates a time $t_{trans(out)}$ required for transferring arithmetically processed data from the first terminal #0_1 to the other terminal #1_9 via the communicating unit 8.

The operation-time estimating unit 3 in the first terminal #0_1 estimates a time $t_{exe}$ required for performing the arithmetic processing of the data aggregated in the first terminal #0_1 by the first terminal #0_1. The total-time calculating unit 5 in the first terminal #0_1 calculates a total time ($t_{trans(in)}$+$t_{exe}$+$t_{trans(out)}$) of the $t_{trans(in)}$ the $t_{exe}$ and the $t_{trans(out)}$ to estimate the total time for the processing (step S1).

Subsequently, the determining unit 6 in the first terminal #0_1 determines whether the total time ($t_{trans(in)}$+$t_{exe}$+$t_{trans(out)}$) for the processing, calculated by the total-time calculating unit 5, satisfies a real time restriction. The power-consumption estimating unit 4 in the first terminal #0_1 then estimates the power consumed at the time of performing by the first terminal #0_1, the arithmetic processing of the data aggregated in the first terminal #0_1. The determining unit 6 in the first terminal #0_1 then determines whether the power consumption estimated by the power-consumption estimating unit 4 is less than power estimated to be consumed at the time of performing the same arithmetic processing by the other terminal #1_9, that is, determines whether the power consumed at the time of performing the arithmetic processing by the first terminal #0_1 is the least (step S2).

If the total time ($t_{trans(in)}$+$t_{exe}$+$t_{trans(out)}$) of the processing satisfies the real time restriction, and an estimated value of power consumption in the first terminal #0_1 is the least (step S2: T (true)), the selecting unit 7 in the first terminal #0_1 selects the CS system (step S3). The server at this time is the first terminal #0_1, and the client is the other terminal #1_9. On the other hand, if the total time ($t_{trans(in)}$+$t_{exe}$+$t_{trans(out)}$) does not satisfy the real time restriction in any of the terminals (step S2: F (false)), the selecting unit 7 in the first terminal #0_1 selects the P2P system (step S4), thereby ending the processing.

According to the first embodiment, if the total time for the processing satisfies the real time restriction, the CS system in which the terminal having the smallest estimated power consumption is designated as the server and other terminals are designated as clients is selected, thereby enabling to suppress power consumption of the entire system including the arithmetic processing by the terminal. If the total time for the processing does not satisfy the real time restriction, consequent to the P2P system being selected, the processing can be performed quickly.

Figure 3:
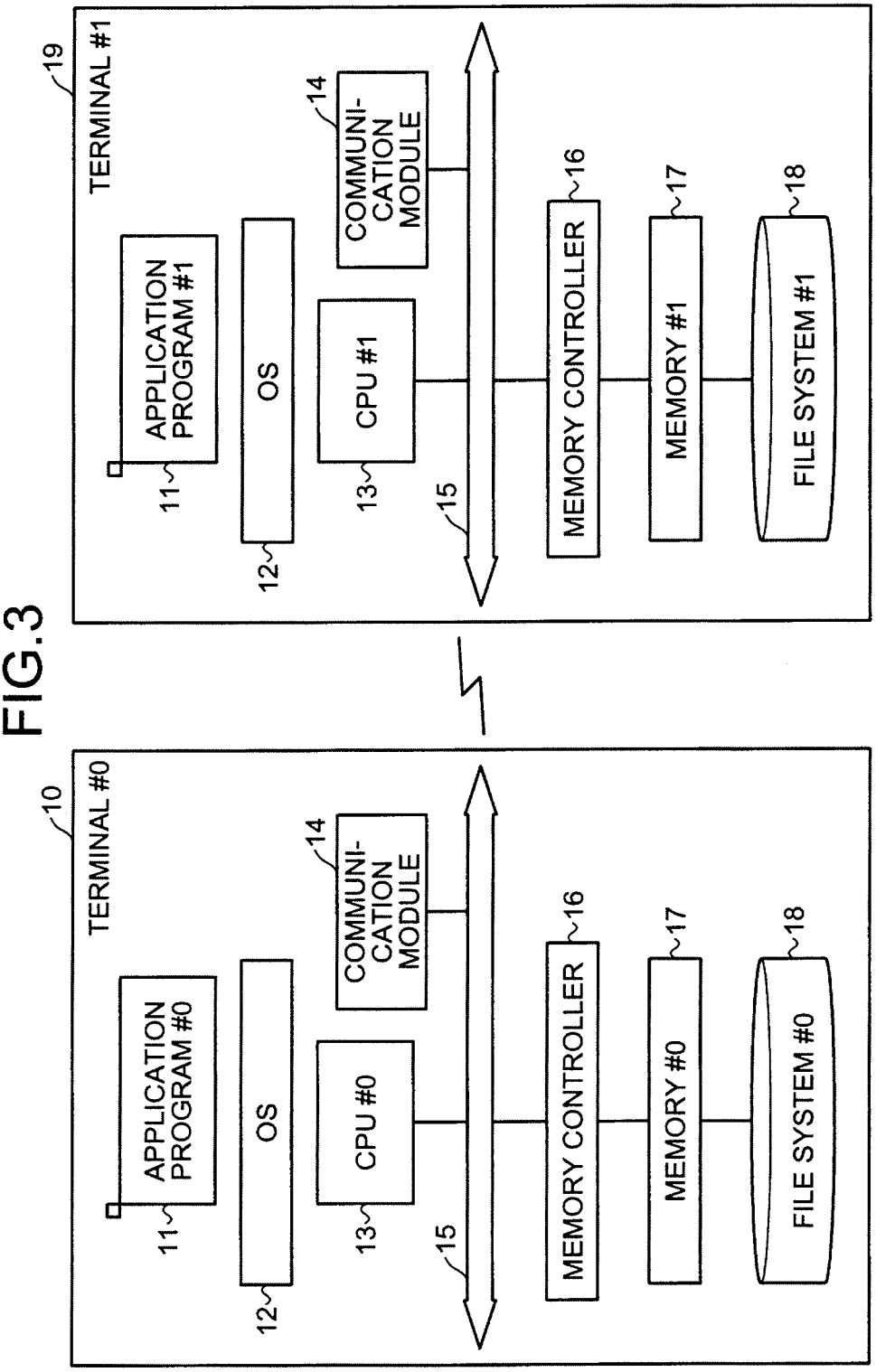
FIG. 3 is a block diagram of the data sharing system according to a second embodiment.

FIG. 3 is a block diagram of the data sharing system according to a second embodiment of the present invention. As depicted in FIG. 3, the data sharing system includes multiple terminals (#0 and #1) 10 and 19. The number of terminals can be three or more. Examples of the terminal include an information processing device having a communication function such as a mobile phone or a mobile laptop computer (a mobile computer).

In the respective terminals (#0 and #1) 10 and 19, a central processing unit (CPU) 13, a communication module 14, and a memory controller 16 are connected via a bus 15. Memory 17 used as a work area by, for example, the CPU 13 is connected to the memory controller 16. A file system 18 is connected to the memory 17. The CPU 13 reads an operating system (OS) 12 from, for example, the file system 18, and executes the OS 12 by using the memory 17 as a work area. A scheduler of the OS 12 decides the data sharing method, and decides the terminal to be a server when the data sharing method is the CS system.

In the respective terminals (#0 and #1) 10 and 19, the OS 12 includes an application data table. When the respective terminals obtain data transferred from another terminal, a parameter for deciding an execution form of the application based on the obtained data is registered in the application data table. When an application program is newly added to the respective terminals (#0 and #1) 10 and 19, information to be described in the application data table is included among data for installing the application. In an installation operation, the information is added to the application data table.

An application program 11 is executed on the OS 12. The CPU 13 reads the application program 11 from, for example, the file system 18, and executes the application program 11 by using the memory 17 as a work area. When data is shared by the terminal #0_10 and the terminal #1_19, the same application program 11 is executed in the terminal #0_10 and the terminal #1_19. Even if the data is shared, for example, according to the P2P system, configuration may be such that the communication module 14 is connected only to a terminal adjacent to the terminal of the communication module 14. Thus, if each terminal is connected only to an adjacent terminal, because data transfer by the respective terminals to the adjacent terminal and data reception from the adjacent terminal are repeated in a pipeline manner, one communication module 14 alone is sufficient in each terminal.

The communication module 14 is used for both the CS system and the P2P system. By changing the mode of software for performing the communication control, the communication module 14 can communicate with the communication module 14 of another terminal in the CS system or the P2P system. The communication module 14 also has a wireless communication function by, for example, Bluetooth (registered trademark) or infrared rays. The communication module 14 measures the distance between the respective terminals by using the wireless communication function via Bluetooth (registered trademark) or infrared rays. For example, the communication module 14 in one terminal transmits a signal that includes data of a transmission time, the communication module 14 in another terminal records the time when the signal is received, and by obtaining the difference between the transmission time and the reception time, the distance between the terminals can be measured. Because functional configurations of the respective terminals (#0 and #1) 10 and 19 are identical to those of the first embodiment, redundant explanations thereof will be omitted.

FIG. 4 depicts an application data table according to the second embodiment. As depicted in FIG. 4, as a data sharing method, for example, "decide at the time of execution", the CS system, or the P2P system is set for each application program for example, in an application data table 21. "Decide at the time of execution" indicates that the data sharing method is decided at the time of executing the application program. In the example depicted in FIG. 4, the data sharing method of the application #0 is set to "decide at the time of execution". The data sharing method of the application #1 is set to the "CS system". The data sharing method of the application #n is set to the "P2P system". The "CS system" and the "P2P system" are set at the time of designing the application program. The CS system may be set for an application program for which reduced power consumption is desired. The P2P system may be set for an application program in which high-speed processing is required.

Furthermore, for example, "power consumption calculation formula", "processing time threshold", and "remaining battery level threshold" can be set in the application data table 21 at the time of designing the application program, as an example of parameters and data used, for example, at the time of deciding the data sharing method for each application program. Further, for example, "CPU load factor", "inter-terminal distance", and "respective terminal remaining battery level" can be collected and set at the time of startup of the application program, as an example of parameters and data used at the time of deciding the data sharing method at the time of execution.

For example, the "power consumption calculation formula" can be a formula modeled based on a simulation result obtained by performing simulation at the time of designing the application program. The "processing time threshold" can be the worst processing time to be satisfied by the application. The "remaining battery level threshold" can be the lowest remaining battery level required for performing the processing by the terminal as the server. The "CPU load factor" can be obtained and set by the scheduler of the OS 12 before the respective terminals obtain data transferred from other terminals. The "inter-terminal distance" can be set by measuring the distance between the terminals by the communication module 14 before the respective terminals obtain the data transferred from other terminals. The "respective terminal remaining battery level" can be obtained and set before each terminal obtains the data transferred from other terminals.

The operation time $t_{exe}$ at the time of executing an application is estimated according to equation (1). In the equation (1), T denotes the execution time at the time of executing simulation of the application program at a reference clock frequency and using data of a reference data size. C denotes the reference clock frequency, and c denotes the clock frequency at the time of estimation, that is, at the time of executing the application program. D denotes the reference data size, and d denotes the data size at the time of estimate.

$$t_{exe}=T \times C/c \times d/D \times (1-\text{CPU load factor}) \quad (1)$$

The data transfer time $t_{trans}$ at the time of executing an application is estimated according to equation (2). In the equation (2), T denotes the transfer time required at the time of transmitting one packet a unit distance. P denotes the packet amount and is [data size]/[data size per one packet]. D denotes a unit distance, and d denotes an inter-terminal distance.

$$t_{trans}=T \times P \times d/D \quad (2)$$

Power consumption $P_{exe}$ at the time of executing an application is estimated according to equation (3). In the equation (3), P denotes power consumption at the time of executing the application program using data of the reference data size. D denotes the reference data size, and d denotes the data size at the time of estimating the power consumption.

$$P_{exe}=P \times D/d \quad (3)$$

The data sharing method according to the second embodiment is performed, for example, according to the flow described below. As advanced preparation, a registration operation of a terminal permitted to share files is performed. The registration operation of the terminal can be performed by, for example, a user. A setting operation of a terminal to be a master provisionally (a provisional master terminal) and a measurement operation of an inter-terminal distance are performed. The provisional master terminal determines whether to select the CS system or the P2P system when the data sharing scheme is to be decided at the time of executing the application program. The CS system or the P2P system is then actually selected, and data transfer and arithmetic processing are performed according to the selected data sharing scheme.

FIGS. 5 and 6 are flowcharts depicting the registration operation of the terminal permitted to share files in the file sharing method according to the second embodiment. FIG. 5 depicts a procedure at the time of registering another terminal #n in a given terminal #0. As depicted in FIG. 5, when the registration operation of the terminal is started, the given terminal #0 requests the other terminal #n to register the terminal #0 as a terminal that shares files (step S11). The given terminal #0 awaits a response to the registration request from the other terminal #n (step S12: F), and receives a response to the registration request (step S12: T).

If the response from the other terminal #n is to permit the registration request (step S13: T), the given terminal #0 registers the terminal #n that has permitted the registration request (step S14), ending the registration operation at the given terminal #0. On the other hand, if the response from the other terminal #n is not to permit the registration request (step S13: F), the given terminal #0 does not register the terminal #n, which has not permitted the registration request, ending the registration operation at the given terminal #0. For example, a user can arbitrarily decide among multiple terminals which terminal is to be the terminal #0 that requests registration of another terminal #n.

FIG. 6 depicts a procedure at the time of registering the given terminal #0 in another terminal #n. As depicted in FIG. 6, when the registration operation of the terminal is started, another terminal #n receives from a given terminal #0, a request to register the given terminal #0 as a terminal that shares files (step S21). If the given terminal #0, which is a sender of the registration request, is registered as a terminal that shares files (step S22: T), the terminal #n that has received the registration request notifies the terminal #0 that registration is permitted (step S23), ending the registration operation at the other terminal #n. On the other hand, if the given terminal #0, which is the sender of the registration request, is not registered as a terminal that shares files (step S22: F), the terminal #n notifies the terminal #0 that the registration is not permitted (step S24), ending the registration operation at the other terminal #n.

Figure 8:
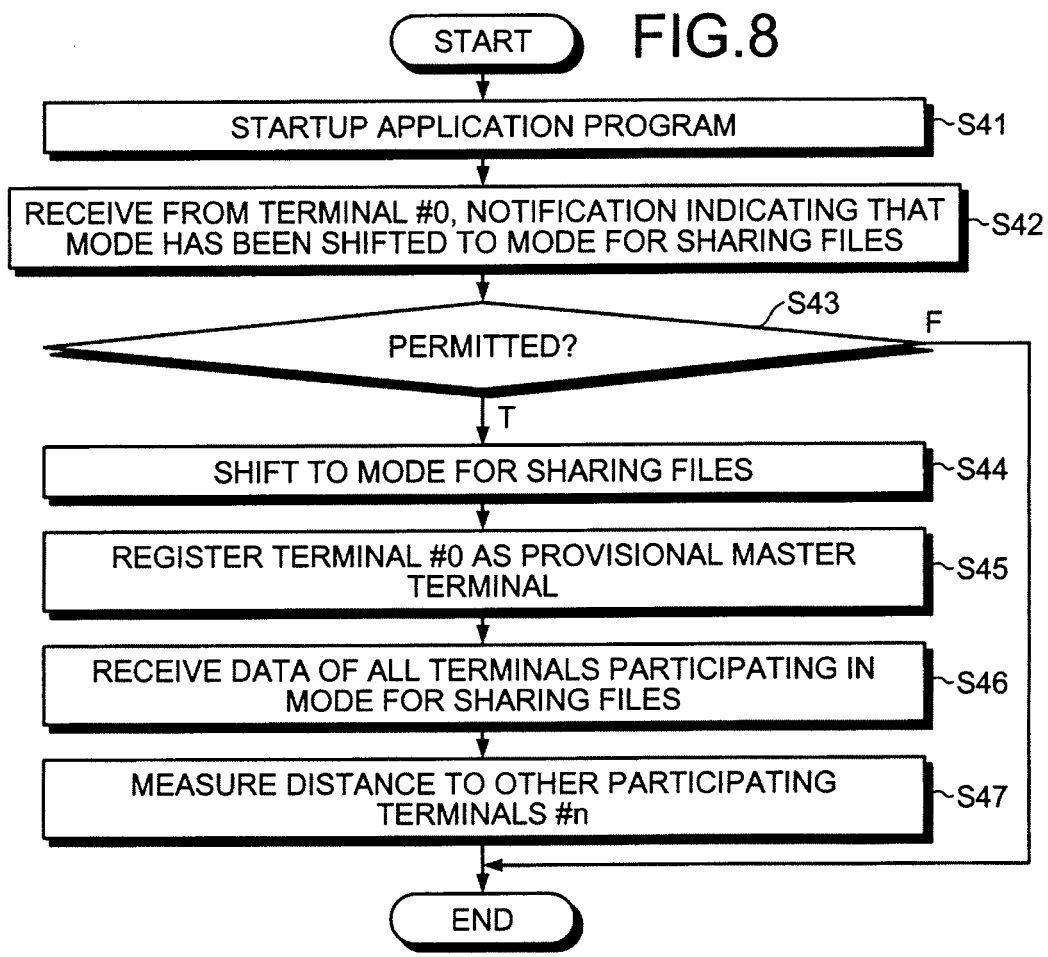
FIG. 8 is a flowchart of a procedure for setting a provisional master terminal and measuring inter-terminal distance, in the data sharing method according to the second embodiment.

FIGS. 7 and 8 are flowcharts depicting the setting operation of the provisional master terminal and the measurement operation concerning the inter-terminal distance in the file sharing method according to the second embodiment. FIG. 7 depicts a procedure for setting the provisional master terminal and measuring the inter-terminal distance by the given terminal #0. As depicted in FIG. 7, when the application program is started up in the given terminal #0 (step S31), the setting operation of the provisional master terminal and the measurement operation of the inter-terminal distance are started.

An application program identical to the application program started up in the given terminal #0 is also started up in another terminal #n. Among terminals that have started up the same application program, the terminal that has started up the application program first, that is, the given terminal #0 in this case is set as the provisional master terminal. In this case, the provisional master terminal may be different from the terminal #0, which has requested another terminal #n for registration at the registration operation of the terminal permitted to share files described above. Alternatively, in the registration operation of the terminal permitted to share files, the terminal #0 that has requested another terminal #n for registration can be the provisional master terminal.

The provisional master terminal #0 shifts to a mode for sharing files with the other terminal #n (step S32). The provisional master terminal #0 establishes a session with the other terminal #n, and notifies the other terminal #n that the mode has been shifted to the mode for sharing files (step S33). The notification destination of the mode shift to sharing files is the terminal registered at step S14. The provisional master terminal #0 awaits a response to the notification shift to the mode for sharing files (step S34: F), and receives a response to the notification of shift to the mode for sharing files (step S34: T).

When responses from all the other terminals #n permit a shift (step S35: T), the provisional master terminal #0 registers the terminals #n that have permitted the shift as the terminals that share files (step S36). The provisional master terminal #0 then notifies all the terminals #n participating in the mode for sharing files of data of all the terminals #n (step S37). The provisional master terminal #0 then measures the distance between the terminal #0 and the respective terminals #n participating in the mode for sharing files (step S38), and releases the session. The provisional master terminal #0 ends the setting operation for setting the provisional master terminal and the measurement operation for the inter-terminal distance.

On the other hand, if a response not permitting the shift is included among the responses from the other terminals #n (step S35: F), the provisional master terminal #0 shifts from the mode for sharing files to a normal mode (step S39), and releases the session. The provisional master terminal #0 ends the setting operation for setting the provisional master terminal and the measurement operation for the inter-terminal distance. In the normal mode, the respective terminals do not share files with other terminals, and execute the started up application program.

FIG. 8 depicts a procedure in the setting operation for setting the provisional master terminal and the measurement operation for the inter-terminal distance performed at the other terminals #n. As depicted in FIG. 8, at another terminal #n, when the application program identical to the application program started up by the given terminal #0 is started up (step S41), the setting operation for setting the provisional master terminal and the measurement operation for the inter-terminal distance are started. The other terminal #n establishes a session with the given terminal #0, and receives from the given terminal #0, notification indicating that the mode has been shifted to the mode for sharing files (step S42).

When the mode is shifted to the mode for sharing files, the terminal #n having received the shift notification sends to the given terminal #0, a response permitting a shift to the mode for sharing files (step S43: T), and shifts to the mode for sharing files (step S44). The terminal #n having shifted to the mode for sharing files registers the terminal #0 as the provisional master terminal (step S45). The terminal #n having shifted to the mode for sharing files receives data of all the terminals participating in the mode for sharing files (step S46).

The terminal #n having shifted to the mode for sharing files measures the distance to other terminals #n participating in the mode for sharing files (step S47), and releases the session. The terminal #n having shifted to the mode for sharing files ends the setting operation for setting the provisional master terminal and the measurement operation for the inter-terminal distance. On the other hand, if the terminal #n having received the shift notification does not shift to the mode for sharing files (step S43: F), the terminal #n releases the session. The terminal #n that does not shift to the mode for sharing files ends the setting operation for setting the provisional master terminal and the measurement operation for the inter-terminal distance.

Figure 9:
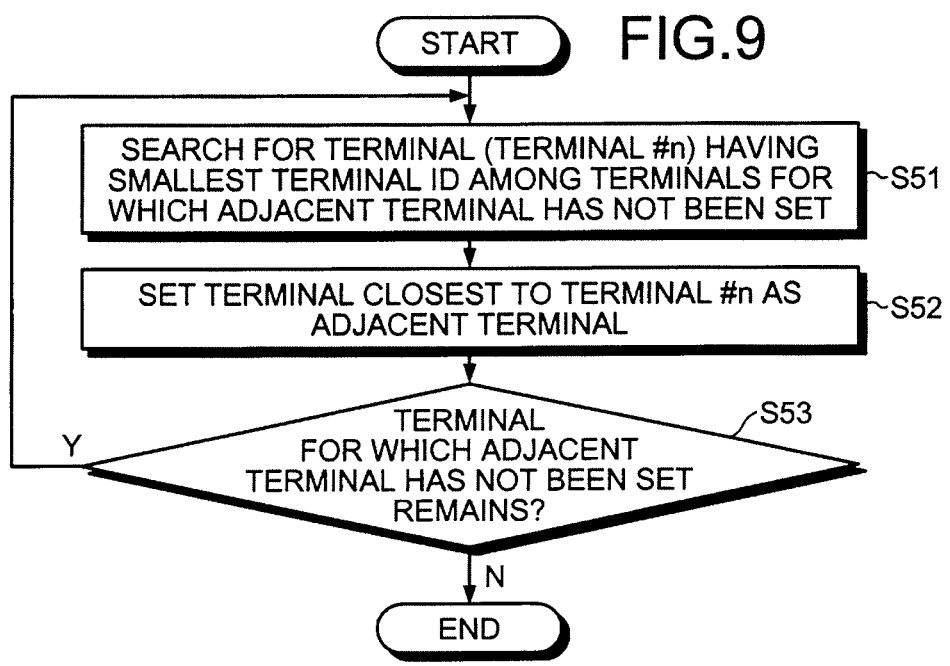
FIG. 9 is a flowchart of a process of deciding an adjacent terminal, in the file sharing method according to the second embodiment.

FIG. 9 is a flowchart depicting a process of deciding an adjacent terminal in the file sharing method according to the second embodiment. As depicted in FIG. 9, when the processing for deciding the adjacent terminal is started, the provisional master terminal #0 searches for a terminal (terminal #n) having, for example, the smallest terminal ID (Identifier) among the terminals, for which an adjacent terminal has not been set (step S51). The provisional master terminal #0 sets the terminal closest to the terminal #n and retrieved at step S51, as a terminal adjacent to the terminal #n (step S52). At this time, the provisional master terminal #0 sets the terminal having the shortest inter-terminal distance, among the inter-terminal distances measured by the provisional master terminal #0 at step S38 and the inter-terminal distances measured by the other terminals #n participating in the mode for sharing files at step S47 and transferred to the provisional master terminal #0 at step S86 described later, as the terminal adjacent to the terminal #n.

The provisional master terminal #0 determines whether a terminal for which an adjacent terminal has not been set remains (step S53). If a terminal for which an adjacent terminal has not been set is present (step S53: Y (Yes)), the provisional master terminal #0 returns to step S51, and repeats steps S51 to S53 until no terminal for which an adjacent terminal has not been set remains. When there is no terminal for which an adjacent terminal has not been set (step S53: N (No)), the provisional master terminal #0 ends the processing for deciding the adjacent terminal.

FIGS. 10 to 14 are flowcharts depicting an overall process in the data sharing scheme selected in the file sharing method according to the second embodiment. FIGS. 10 and 11 depict a process procedure by the provisional master terminal #0. As depicted in FIG. 10, when the processing is started in the provisional master terminal #0, the provisional master terminal #0 obtains data, which becomes input data of the application program (step S61). For example, when the application program is an application for coupling images captured by the respective terminals to generate a large picture such as a panoramic picture, an image file becomes the input data.

The provisional master terminal #0 obtains the CPU load factor, the data size, and the remaining battery level information of the provisional master terminal #0 (step S62). The provisional master terminal #0 then notifies the other terminals #n of the data size of the data of the provisional master terminal #0 (step S63). At this time, the other terminals #n also notify the provisional master terminal #0 of the data size of the data of the terminals #n. The provisional master terminal #0 calculates the entire data size of the data to be processed by the application program based on the data size notified from the other terminals #n and the data size of the provisional master terminal #0.

The provisional master terminal #0 estimates the operation time ($t_{exe}$) based on the entire data size and the CPU load factor of the provisional master terminal #0 (step S64). The provisional master terminal #0 also estimates the data transfer time ($t_{trans}$) based on the entire data size and the inter-terminal distance (step S65). The provisional master terminal #0 selects a sharing scheme (step S66). A selection procedure for selecting a sharing scheme is described later.

When the P2P system is to be selected (step S66: P2P system), the provisional master terminal #0 selects the P2P system, and notifies the other terminals #n that the data is shared according to the P2P system (step S67). The provisional master terminal #0 transfers the data of the provisional master terminal #0 obtained at step S61 to the terminal adjacent to the provisional master terminal #0 (step S68). The adjacent terminal is decided by the process procedure depicted in FIG. 9. The provisional master terminal #0 receives the data of the adjacent terminal from the terminal adjacent to the provisional master terminal #0 (step S69). Until all data have been received (step S70: F), steps S68 to S70 are repeated. When all the data have been received (step S70: T), the provisional master terminal #0 performs the arithmetic processing (step S71), ending processing at the provisional master terminal #0.

On the other hand, when the provisional master terminal #0 is to select the sharing scheme (step S66), at the time of selecting the CS system (step S66: CS system), as depicted in FIG. 11, the provisional master terminal #0 selects the CS system, and notifies the other terminals #n of the terminal that is to become the server (step S72). Next, the terminal #0, which has been the provisional master terminal, transfers the data of the terminal #0 obtained at step S61 to the terminal that is to become the server (step S73). The terminal that becomes the server performs the arithmetic processing by using the data transferred from other terminals, and transfers an arithmetic processing result to the respective terminals. The terminal #0, which has been the provisional master terminal, receives the arithmetic processing result transferred from the terminal that has become the server (step S74), ending the processing at the provisional master terminal #0.

FIGS. 12 and 13 depict process procedures by the other terminals #n. As depicted in FIG. 12, when the processing is started in another terminal #n, the other terminal #n obtains the data to be the input data of the application program (step S81). The other terminal #n obtains the CPU load factor, the data size, and the information of the remaining battery level of the other terminal #n (step S82). The other terminal #n notifies other terminals including the provisional master terminal #0 of the data size of the data obtained at step S81 (step S83). The other terminal #n calculates the entire data size of the data to be processed by the application program based on the data size notified from the other terminals including the provisional master terminal #0 and the data size of the data obtained at step S81.

The other terminal #n estimates the operation time ($t_{exe}$) based on the entire data size and the CPU load factor of the other terminal #n (step S84). The other terminal #n estimates the data transfer time ($t_{trans}$) based on the entire data size and the inter-terminal distance (step S85). Next, the other terminal #n transfers to the provisional master terminal #0, the estimated operation time ($t_{exe}$) the data transfer time ($t_{trans}$) the CPU load factor, the remaining battery level, and the inter-terminal distance (step S86).

The other terminal #n awaits notification from the provisional master terminal #0, indicating the sharing scheme selected by the provisional master terminal #0 (step S87: F). Upon receiving notification that the P2P system has been selected (step S87: P2P system), the other terminal #n establishes a session with the adjacent terminal based on the data of all the terminals participating in the mode for sharing files (step S88). The other terminal #n transfers the data obtained at step S81 to the terminal adjacent to the other terminal #n (step S89). The adjacent terminal is decided by the process procedure depicted in FIG. 9.

The other terminal #n receives the data of the adjacent terminal from the terminal adjacent to the other terminal #n (step S90). Until all data have been received (step S91: F), steps S89 to S91 are repeated. When all the data have been received (step S91: T), the other terminal #n performs the arithmetic processing (step S92), ending processing at the other terminal #n.

On the other hand, if the provisional master terminal #0 notifies the other terminal #n of information indicating that the provisional master terminal #0 has selected the CS system and the terminal to be the server (step S87: CS system), as depicted in FIG. 13, the other terminal #n establishes a session with the terminal selected to be the server (step S93). The other terminal #n transfers the data obtained at step S81 to the terminal selected to be the server (step S94). The terminal selected to be the server performs the arithmetic processing by using the data transferred from other terminals, and transfers an arithmetic processing result to the respective terminals. The other terminal #n receives the arithmetic processing result transferred from the terminal as the server (step S95), ending the processing at the other terminal #n.

FIG. 14 depicts a process procedure by a terminal #m as the server. As depicted in FIG. 14, when the processing is started in the terminal #m as the server, the terminal #m as the server first establishes a session with the terminals to be the clients, that is, the other terminals #n excluding the terminal #0, which has been the provisional master terminal, and the terminal #m as the server (step S101). The terminal #m as the server receives the data transferred by the terminal #0 at step S73 and the data transferred by the other terminals #n at step S94 (step S102). The terminal #m as the server performs the arithmetic processing by using the data of the terminal #m as the server and the data received at step S102 (step S103). The terminal #m as the server transfers an arithmetic processing result to the other terminals #n excluding the terminal #0, which has been the provisional master terminal, and the terminal #m as the server (step S104), ending the processing at the terminal #m as the server.

FIG. 15 is a flowchart depicting a selection procedure for selecting the sharing scheme in the file sharing method according to the second embodiment. The number of terminals is N (N is an integer of 2 or more), and n is an integer of from 0 to N−1. As depicted in FIG. 15, when the selection processing of the sharing scheme is started, the provisional master terminal #0 sets the sharing scheme to the P2P system (step S111). The provisional master terminal #0 sets n to 0 (step S112), and while n is a value smaller than N−1 (step S113: T), repeats steps S113 to S120.

Regarding the terminal #n, if the processing time is shorter than a real time restriction (a processing time threshold) (step S114: T), a remaining battery level$_{\#n}$ is higher than a remaining battery level threshold (step S115: T), and power consumption P$_{\#n}$ is less than the smallest power consumption P$_{smallest}$ at that time (step S116: T), the provisional master terminal #0 selects the CS system. The provisional master terminal #0 sets the terminal #n at this time as the terminal to be the server (step S119). The value of n is then incremented (step S120).

If the results at steps S114 and S115 are true (T) and the result at S116 is false (F), the sharing scheme is selected at steps S117 and S118. That is, when the power consumption P$_{\#n}$ of the terminal #n is equal to the smallest power consumption P$_{smallest}$ at that time (step S117: T), if the CPU load factor$_{\#n}$ of the terminal #n is smaller than the smallest CPU load factor$_{smallest}$ at that time (step S118: T), the provisional master terminal #0 selects the CS system, and sets the terminal #n at that time as the terminal to be the server (step S119). The value of n is then incremented (step S120).

If the results at steps S114, S115, S117, and S118 are false (F), the provisional master terminal #0 does not change the P2P system and increments the value of n (step S120). Furthermore, if n is not a value smaller than N−1 (step S113: F), the provisional master terminal #0 ends the processing.

An example of calculating the processing time when the terminal #n is the terminal to be the server is depicted below. For example, it is assumed that the inter-terminal distance and the data size of the terminal #0 are 1 meter and 100 kilobytes, respectively. It is also assumed that the inter-terminal distance and the data size of the terminal #1 are 2 meters and 150 kilobytes, respectively, and the inter-terminal distance and the data size of a terminal #n−1 are 5 meters and 100 kilobytes, respectively. Examples concerning other terminals will be omitted. In this example, the processing time at the terminal #n is expressed by equation (4).

$$\begin{aligned}\text{processing time} &= t_{exe} + \sum t_{trans} \\ &= T \times C/c \times d/(100KB + 150KB + \ldots + 100KB) \times \\ &\quad (1 - CPU \text{ load factor}) + \\ &\quad (T_0 \times 100KB/128B \times 1m/D) + \\ &\quad (T_1 \times 150KB/128B \times 2m/D) + \ldots + \\ &\quad (T_{n-1} \times 100KB/128B \times 5m/D) + \\ &\quad \left(T_n \times \left(\begin{array}{c}100KB + \\ 150KB + \ldots + \\ 100KB\end{array}\right) \middle/ 128B \times 1m/D\right) + \\ &\quad \left(T_n \times \left(\begin{array}{c}100KB + \\ 150KB + \ldots + \\ 100KB\end{array}\right) \middle/ 128B \times 2m/D\right) + \ldots + \\ &\quad \left(T_n \times \left(\begin{array}{c}100KB + \\ 150KB + \ldots + \\ 100KB\end{array}\right) \middle/ 128B \times 1m/D\right)\end{aligned} \quad (4)$$

In equation (4), the second line is for calculating the operation time. The third to the sixth lines are calculating the time required for transferring data obtained by each terminal from each terminal to the terminal #n as the server. The seventh to the tenth lines are for calculating the time required for transferring an arithmetic processing result in the terminal #n as the server. It is assumed here that data transfer from each terminal to the terminal #n as the server and data transfer from the terminal #n as the server to each terminal are not performed simultaneously.

The second embodiment can achieve effects identical to those of the first embodiment.

The present invention enables a data sharing scheme to be selected according to power consumption and processing speed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data sharing system for digital communications, the data sharing system comprising:
a plurality of terminals configured to communicate with each other, wherein:
the data sharing system is configured to select a server-client system in which among the terminals, a first terminal of the plurality of terminals is designated as a server and other terminals of the plurality of terminals are designated as clients, when (i) a total sum of a first data transfer time estimated to be required for transferring data to the first terminal from the other terminals, an operation time estimated to be required for performing, by the first terminal, arithmetic processing of the data aggregated in the first terminal, and a second data transfer time estimated to be required for transferring the arithmetically processed data from the first terminal to the other terminals satisfies a real time restriction in the first terminal, the real time restriction being configured to be set in advance or at a time of designing an application program, and (ii) power estimated to be consumed at a time of performing, by the first terminal, the arithmetic processing of the data aggregated in the first terminal is substantially equal to a smallest amount of power among a plurality of power consumption estimates determined to be consumed at a time of performing the arithmetic processing of the data by the other terminals; and the data sharing system is configured to select a peer-to-peer system, when the total sum does not satisfy the real time restriction in any of the terminals.

2. The data sharing system according to claim 1, wherein the data sharing system is further configured to select the server-client system in which the first terminal is designated as the server and the other terminals are designated as the clients, when a load factor at the time of performing the arithmetic processing of the data by a processor of the first terminal is smaller than a load factor at the time of performing the arithmetic processing of the data by a second processor of a terminal for which the smallest amount of power is estimated.

3. The data sharing system according to claim 1, wherein a calculation formula for estimating power consumption is set in advance and is described in the application program.

4. The data sharing system according to claim 2, wherein:
a calculation formula for estimating power consumption is set at a time of designing the application program and is described in the application program, and
the load factor of the processor is determined at startup of the application program.

5. A terminal for digital communications, the terminal comprising:
a memory; and
at least one processor coupled to the memory and configured to:
communicate with other terminals;
estimate a first data transfer time required for transferring data to the terminal from the other terminals configured to communicate with each other, and a second data transfer time required for transferring arithmetically processed data to the other terminals from the terminal;
estimate an operation time required for performing, by the terminal, arithmetic processing of the data aggregated in the terminal;
calculate a total sum of the estimated first data transfer time, the estimated second data transfer time, and the estimated operation time;
estimate power consumed at a time of performing, by the terminal, the arithmetic processing of the data aggregated in the terminal;
determine whether the calculated total sum satisfies a real time restriction in the terminal, the real time restriction being configured to be set in advance or at a time of designing an application program; and
select a server-client system in which the terminal is designated as a server and the other terminals are designated as clients, upon determining that (i) the total sum satisfies the real time restriction in the terminal and (ii) the estimated power consumed is substantially equal to a smallest amount of power among a plurality of power consumption estimates determined to be consumed at a time of performing the arithmetic processing of the data by the other terminals, or select a peer-to-peer system when the total sum does not satisfy the real time restriction.

6. The terminal according to claim 5, wherein the at least one processor is further configured to select the server-client system in which the terminal is designated as the server and the other terminals are designated as the clients, upon determining that the total sum satisfies the real time restriction in the terminal and and if a load factor at the time of performing the arithmetic processing of the data by the processor of the terminal is smaller than a load factor at the time of performing the arithmetic processing of the data by a second processor of a terminal for which the smallest amount of power is estimated.

7. The terminal according to claim 5, wherein a calculation formula for estimating power consumption is set in advance and is described in the application program.

8. The terminal according to claim 6, wherein:
a calculation formula for estimating power consumption is set in advance and is described in the application program, and
the at least one processor is configured to obtain the load factor of the at least one processor at startup of the application program.

9. A data sharing method for a plurality of terminals configured to communicate with each other, the data sharing method comprising:
estimating a total sum of a first data transfer time estimated to be required for transferring data to a first terminal of the plurality of terminals from other terminals of the plurality of terminals, an operation time estimated to be required for performing, by the first terminal, arithmetic processing of the data aggregated in the first terminal, and a second data transfer time estimated to be required for transferring the arithmetically processed data from the first terminal to the other terminals;
selecting a server-client system in which the first terminal is designated as a server and the other terminals are designated as clients, when (i) the total sum satisfies a real time restriction in the first terminal, the real time restriction being configured to be set in advance or at a time of designing an application grogram, and (ii) power estimated to be consumed at a time of performing, by the first terminal, the arithmetic processing of the data aggregated in the first terminal is substantially equal to a smallest amount of power among a plurality of power consumption estimates determined to be consumed at a time of performing the arithmetic processing by the other terminals; and
selecting a peer-to-peer system when the total sum does not satisfy the real time restriction in any of the terminals.

10. The data sharing method according to claim 9, wherein selecting a server-client system includes selecting the server-client system in which the first terminal is designated as the server and the other terminals are designated as the clients, when a load factor at the time of performing the arithmetic processing of the data by a first processor of the first terminal is smaller than a load factor at the time of performing the arithmetic processing of the data by a second processor of a terminal for which the smallest amount of power is estimated.

11. The data sharing method according to claim 9, wherein a calculation formula for estimating power consumption is described in the application program.

12. The data sharing method according to claim 10, wherein:
a calculation formula for estimating power consumption is described in the application program, and the load factor of the first processor is determined at startup of the application program.

13. The data sharing system according to claim 1, wherein the real time restriction comprises a processing time threshold.

14. The data sharing system according to claim 3, wherein the application program is configured to be executed by processors of one or more of the terminals.

* * * * *